March 8, 1932.  J. R. GAMMETER  1,848,164

DIPPED RUBBER GOODS

Filed Oct. 17, 1930

INVENTOR
John R. Gammeter

BY

ATTORNEYS

Patented Mar. 8, 1932

1,848,164

UNITED STATES PATENT OFFICE

JOHN R. GAMMETER, OF AKRON, OHIO

DIPPED RUBBER GOODS

Application filed October 17, 1930. Serial No. 489,329.

This invention relates to dipped rubber goods and to a method for making the same.

Dipped rubber goods, such as cots, gloves, etc., as heretofore made have been substantially of uniform thickness, it having been necessary where cots or gloves with heavier rubber portions are required to make the same by a molding rather than a dipping process.

In rubber cots and gloves, the portions where reinforcements are desirable are the tip portions at which breakage is most likely to occur. The present invention has for its object the provision of a dipped rubber cot, glove or the like with a reinforced tip or tips, and a method for effectively making the same.

The foregoing and other objects of the invention are attained in the article and method of manufacture thereof as illustrated in the accompanying drawings and described below. It is to be understood that the invention is not limited to the specific form thereof shown and described.

Figure 1:
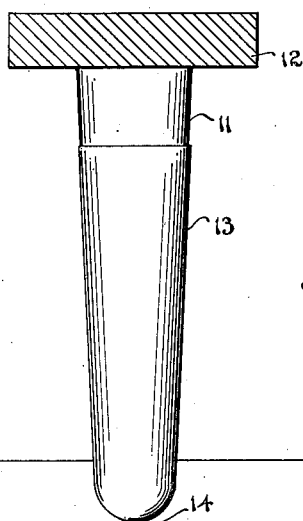
Figure 2:
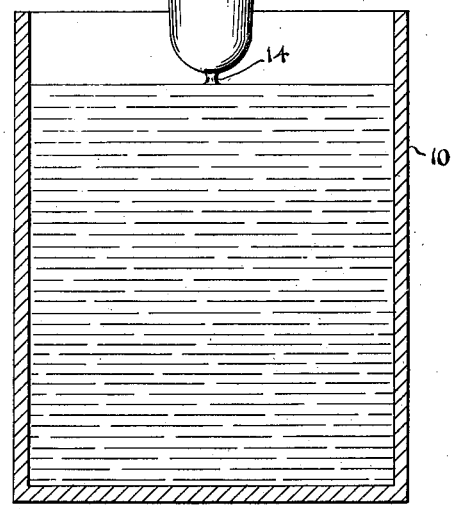
Figure 2:
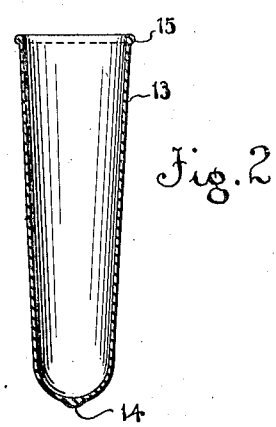

Of the accompanying drawings,

Figure 1 is a section through a dipping tank illustrating the manner of dipping a form for making rubber goods in accordance with the invention; and Figure 2 is a longitudinal diametral section through an article embodying the invention upon its completion.

Referring to the drawings, the numeral 10 designates a suitable dipping tank in which is dispersed rubber in fluid form, preferably natural latex. One or more forms 11, 11, which as here shown are finger cot forms, may be mounted on a board or carrier 12 and are dipped into tank 10 and withdrawn to leave a film of rubber 13 on the form. The forms are so withdrawn from the tank as to leave a teat 14 of rubber at the tip thereof and while the rubber is still flowable the form is not inverted.

The form may be dipped one or more times to secure articles of the desired thickness and preferably are dried between each dipping, all the while maintaining the form in the position in which it was dipped so that the rubber goods will be dried with the teats on the tip portions thereof.

The goods are next subjected to the ring or bead rolling operation and vulcanized as will be understood by skilled artisans. The finished goods as is shown in Figure 2 has a reinforced tip at 14 and the usual bead or ring at 15.

Modifications of the invention may be resorted to without departing from the spirit thereof or the scope of the appended claims.

What is claimed is:—

1. A dipped rubber article made of liquid latex dried and vulcanized and having a reinforced tip thereon comprising a solid teat of rubber formed on the ends of the goods by dipping and drying the goods without inverting the dipping forms.

2. A dipped rubber article made of liquid latex dried and vulcanized and having a reinforced tip comprising a solid teat of rubber thereon.

3. An article of rubber made by dipping a form in latex and withdrawing to leave a film with a solid teat of latex at the tip and drying the latex without inverting the form.

JOHN R. GAMMETER.